June 7, 1932.    O. TUERCK    1,861,727
APPARATUS FOR MAKING CONCRETE PIPE
Filed Oct. 22, 1928    3 Sheets-Sheet 1

INVENTOR;
OSCAR TUERCK.
BY Horace Barnes,
ATTORNEY.

June 7, 1932.   O. TUERCK   1,861,727
APPARATUS FOR MAKING CONCRETE PIPE
Filed Oct. 22, 1928   3 Sheets-Sheet 2
Fig. 7.
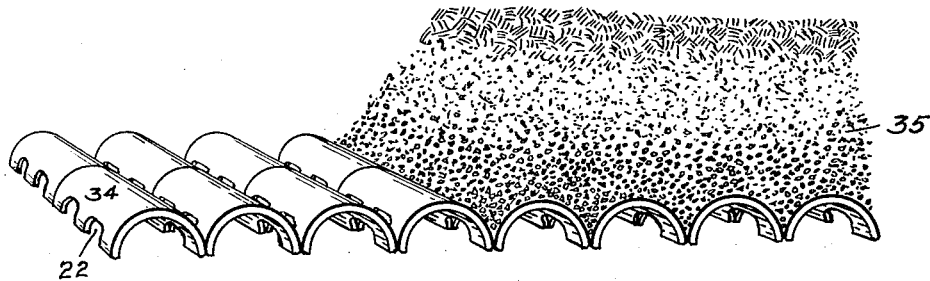
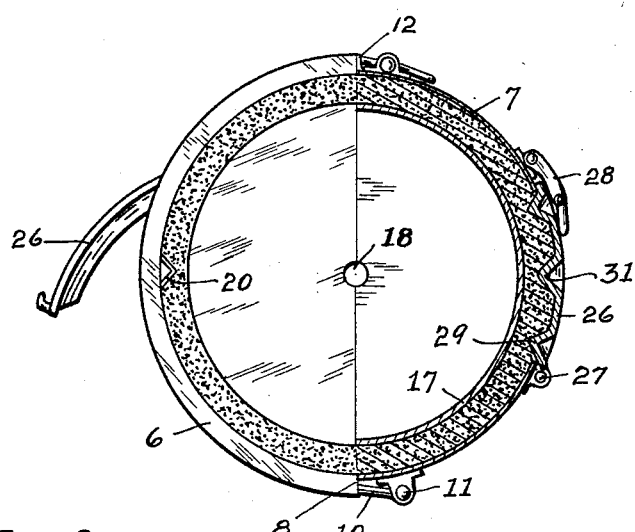
Fig. 2.
INVENTOR;
OSCAR TUERCK.
BY Horace Barnes,
ATTORNEY.

June 7, 1932.  O. TUERCK  1,861,727
APPARATUS FOR MAKING CONCRETE PIPE
Filed Oct. 22, 1928  3 Sheets-Sheet 3

INVENTOR;
OSCAR TUERCK.
BY Horace Barnes,
ATTORNEY.

Patented June 7, 1932

1,861,727

UNITED STATES PATENT OFFICE

OSCAR TUERCK, OF PORTLAND, OREGON, ASSIGNOR TO TUERCK-MacKENZIE COMPANY, OF PORTLAND, OREGON, A CORPORATION OF OREGON

APPARATUS FOR MAKING CONCRETE PIPE

Application filed October 22, 1928. Serial No. 314,071.

This invention relates to improvements in concrete pipe of a special variety adapted for employment in sewage-disposal fields, and for underground conduits for transmission lines of electric current, and for numerous other uses, and to the method and apparatus for making said pipe.

The principal object of the invention is to provide a pipe of plastic concrete material provided with pre-arranged grooves in its outer superficies whereby the pipe may be transported with safety to its destination in its original cylindrical condition and may then be readily fractured along such grooved lines into half-sections to adapt it for the intended use.

A further object of the invention is the provision of a novel method of forming concrete pipe in cylindrical sections or lengths having their walls indented with lines of grooves whereat the pipe is weakened to facilitate the cracking and breakage of the pipe along such pre-arranged lines to form semi-cylindrical sections of pipe for various uses.

A still further object of the invention is to provide an ancillary method, together with the apparatus to accomplish the same, to form ported openings in the pipe through the indentation of the pipe in annular or other continuous channels whereby circular, elliptical, or other-shaped portions of the pipe may be broken along their weakened marginal edges for the quick and convenient removal of a slab of the pipe wall to form such opening.

Other objects and advantages residing in my invention, and objects relating to various details of construction and method of manufacture, will be readily apparent in the course of the full description to follow.

The accompanying drawings illustrate by way of example a representative form of my improved pipe and the apparatus for making the same, in which:

Fig. 2 is a view partly in plan and partly in cross-section of said mold in which the pipe is shown.

Fig. 7 is a fragmentary pictorial view partly in section, of a sewage-disposal field illustrating one of the uses to which my improved pipe may be accommodated.

Figure 1:
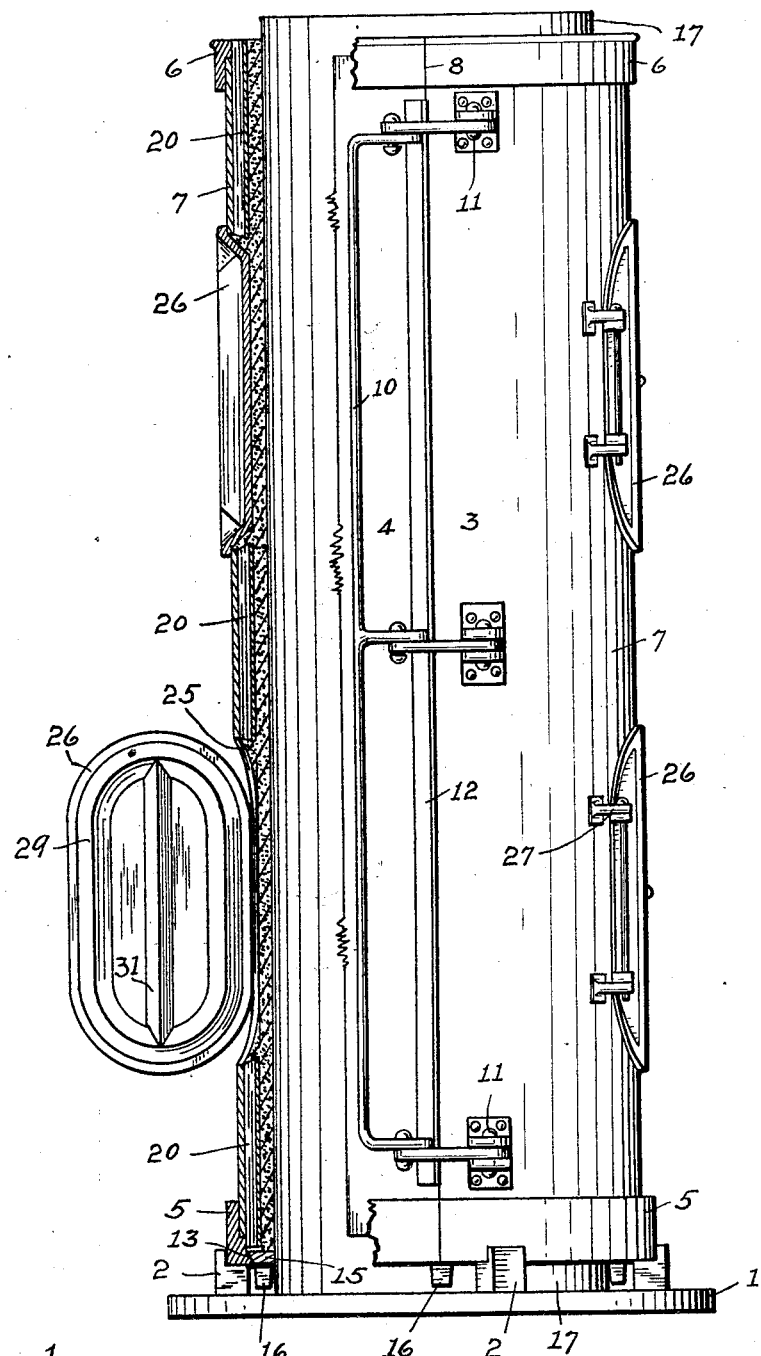
Figure 1 is a view partly in side elevation and partly in longitudinal section of a mold utilized in my invention in which a pipe is shown made in accordance with my improved process.

Referring to said views, the reference numeral 1 indicates a revoluble turntable appertaining to a concrete pipe-forming machine, not otherwise shown, upon which supporting blocks 2 are adjustably secured in equidistant radial positions relative to the axis of rotation of the turntable. An exterior mold-jacket is supported upon said blocks in concentric relation with the axis of the turntable and consists in two semi-cylindrical sections 3 and 4. Each such section comprises a base-casting 5, an upper rim-casting 6 and an intermediate sheet-metal body 7 rigidly connected to said castings at its opposite ends and adapted to mold the exterior of the pipe. Said sections are clamped together in cylindrical condition along their vertical marginal edges 8 through a clamping member 10 hinged at 11 to one of the sections and engaging an angle-strip 12 upon the opposite section at opposite sides of the jacket, in a well understood manner.

The base-casting 5 is formed with an inwardly extending flange 13 beveled upon its upper side upon which an annular palette 15 is seated when the sections are clamped together, the upper surface of the palette being of the desired thickness of the pipe to be formed thereon. Said palette is provided with relatively short legs 16 which when the mold is supported upon the blocks 2 are elevated above the turntable 1.

17 indicates a cylindrical core to form the interior surface of the pipe and is movable longitudinally of the jacket by means of a centrally disposed shaft, not shown, extending through the aperture 18 of the core, see Fig. 2.

Extending longitudinally of each of the jacket-sections 3 and 4 and intermediate their side marginal edges 8 upon the inner surface a V-shaped metal angle 20 is rigidly secured protruding at its apex into the mold-space where the pipe is formed and adapted to mold a longitudinally directed groove 21 in the outer surface of the pipe. Said grooves as formed by each section will occur at diametrically opposite positions on the pipe and will facilitate the fracture of the pipe along such weakened lines to split the pipe into two approximately equal sections that may be used as such, as in culverts, or that may be reunited along their fractured edges, as is the practice in underground conduit construction for electric transmission lines in city streets, as will be more fully explained.

Where the sections are employed as underdrains for sewage-disposal plants, see Fig. 7, it is desirable in addition to facilitating the rupture of the pipe into half-sections to provide gaps 22 in their marginal edges for the seepage of the drainage-liquids thereinto. For this purpose provision is made for the ready removal of a slab 23 from the body of the pipe at predetermined positions upon the opposite sides thereof either before or after the longitudinal fracture of the pipe. To this end openings 25 are made in the jacket-sections of desired configuration, in this instance being shown as of elliptical form, having their major axes in alignment with the angles 20, that is to say, midway between the lateral marginal edges of the sections.

Figure 3:
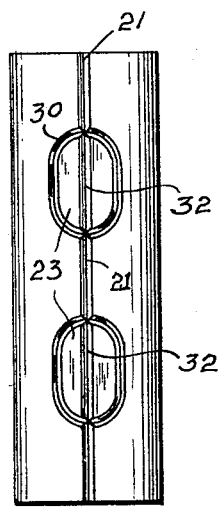
Fig. 3 is a view in side elevation of my improved pipe shown in the condition in which it is taken from the mold.
Figure 4:
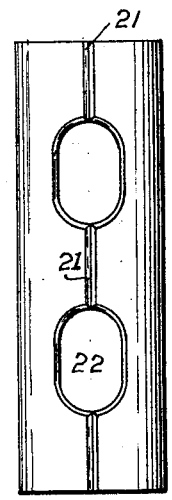
Fig. 4 is a view similar to Fig. 3 showing the pipe with the scored slabs removed making openings in the pipe-walls.

An exteriorly overlapping door 26 is provided for each said opening which are hinged upon one side, as at 27 and furnished with a fastening device 28 at their opposite sides. Each said door is provided with a continuous metal angle 29 closely following the contour of the opening and similar to the angles 20 and adapted to extend within the mold-space when the door is closed and form an elliptical or other shaped groove, such as is shown at 30, in the pipe each such groove delimiting a slab 23 in the pipe-walls, see Fig. 3, that may be readily broken out and leave an aperture in the pipe, as shown in Fig. 4.

Desirably the doors 26 are also provided with a vertically directed angle 31 in alignment with the angle-portions 20 which will form a groove 32 in the slab-portion 23 in continuation of the longitudinal groove 21.

The method of forming said pipe and fitting the same for its various uses may be described as follows: The jacket-sections are secured together and mounted upon the blocks 2 of the turntable with the palette 15 positioned therein in the manner described. With the core 17 positioned concentrically of the jacket, the doors are closed and secured whereby the angle-pieces 29 and 31 are protruded into the mold-space. The plastic concrete material is then fed into the mold-space and thoroughly tamped while the turntable is rotated. When the pipe is formed the jacket is removed from the machine and the doors 26 are opened to withdraw the angle-pieces 29 and 31 from engagement with the newly formed pipe.

The jacket and pipe therein will then be supported upon the legs 16 of the palette and upon the loosening of the clamps 10 the jacket-sections may be readily slid downwardly along the pipe to rest upon the floor which slip-movement will in great measure release the grip of the jacket upon the pipe due to suction and admit of the removal of the jacket with relative ease. With the jacket removed the pipe will appear substantially as shown in Fig. 3 with the grooves 21, 30 and 32 formed therein.

While in its pre-set condition soon after removal from the mold the slabs 23 formed by the angles 29 may be readily knocked out, as seen in Fig. 4, whereupon the pipe is allowed to fully set before shipping in its cylindrical form in which shape it is stronger and more capable of withstanding shipping conditions and the crushing strains undergone when piled on flat-cars than when parted into its final semi-cylindrical condition.

Figure 5:
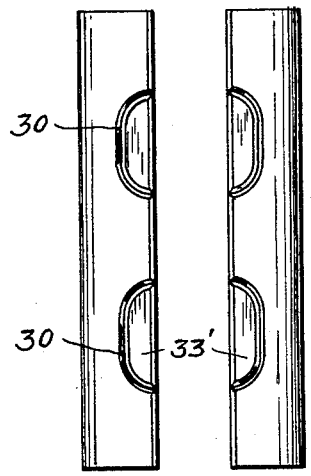
Fig. 5 is a view similar to Fig. 3 with the pipe split in its semi-cylindrical form.
Figure 6:
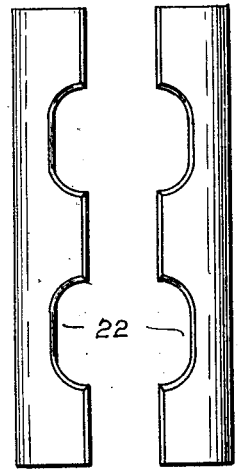
Fig. 6 is a view similar to Fig. 4 with the pipe split longitudinally.

When the pipe is to be used where it is manufactured the pipe may be split longitudinally as a preceding operation after being substantially in set condition, as seen in Fig. 5, and then the smaller slabs 33' may be knocked out leaving the gaps 22 in its edges, as shown in Fig. 6, in which condition the sections are ready for use in the sewage-disposal field.

The principal use contemplated for my improved pipe-sections is as drainage-tile for sewage-disposal plants, see Fig. 7, where the sections 34 are laid in inverted position in longitudinal and transverse rows completely underlying the field where the sewage is emptied upon the surface and the liquid content thereof percolates through several feet of earth and gravel 35. The gaps 22 in the edges of the sections admit of the ready entrance of the water into the channels afforded by the inverted sections and lead the drainage water to suitable outfall in purified condition.

In the adaptation of the pipe for electric wire conduits the pipe may or may not be provided with the continuous grooves 30, although these may be provided in modified form if desired for the introduction of branch wires. The trench in which the pipe is laid being formed the pipe is split and one section of each length of pipe is laid in the trench with its open side directed upwardly and the sections suitably joined at their ends. The wires are then laid in the open conduit thus offered whereupon the other half-sections are laid upon those in the trench, each being joined to its companion section whereby perfect joints are effected and the joints sealed by proper grouting. The trench is then filled in in the usual manner.

Still another valued use of the invention is in making T and Y joints in concrete pipe whereby the openings in the pipe may be readily made and the pre-molded branches added and joined thereto in a well understood manner.

Having described my invention, what I claim, is:—

1. In apparatus for forming concrete pipe, a cylindrical mold-jacket having an opening in its side wall, a core in said jacket providing a mold-space therebetween, a door closing said opening, and means on said door projecting into said mold-space to form depressions in the exterior of the pipe formed in said mold-space.

2. In apparatus for forming concrete pipe, a cylindrical mold-jacket having an opening in its side wall, a core in said jacket providing a mold-space therebetween, a longitudinally directed ridge upon the interior surface of the jacket extending into said mold-space, a door closing said opening, and a substantially elliptical ridge upon said door arranged symmetrically with respect to said longitudinal ridge extending into said mold-space.

OSCAR TUERCK.